United States Patent [19]

Dannoura

[11] Patent Number: 4,655,274
[45] Date of Patent: Apr. 7, 1987

[54] HORIZONTAL MOLD CLAMPING AND VERTICAL INJECTION TYPE DIE CAST MACHINE

[75] Inventor: Sadayuki Dannoura, Ube, Japan

[73] Assignee: Ube Industries, Ltd., Yamaguchi, Japan

[21] Appl. No.: 789,807

[22] Filed: Oct. 21, 1985

[30] Foreign Application Priority Data

Oct. 26, 1984 [JP] Japan ............................ 59-161209[U]
Dec. 21, 1984 [JP] Japan ................................ 59-268449

[51] Int. Cl.⁴ ........................ B22D 33/04; B29C 45/02
[52] U.S. Cl. .................................. 164/341; 164/342; 264/328.11; 425/544; 425/556; 425/574; 425/586
[58] Field of Search ............... 425/150, 542, 556, 574, 425/586, 589, 593, 544; 264/328.11; 164/341, 342

[56] References Cited

U.S. PATENT DOCUMENTS

| 4,286,942 | 9/1981 | Fuzioka et al. | 425/542 |
| 4,389,183 | 6/1983 | Laurent et al. | 425/589 |
| 4,531,702 | 7/1985 | Plummer | 425/589 |
| 4,556,377 | 12/1985 | Brown | 425/574 |

FOREIGN PATENT DOCUMENTS 58-55859 12/1983 Japan .
59-13941 4/1984 Japan .

Primary Examiner—Jay H. Woo
Assistant Examiner—Timothy W. Heitbrink
Attorney, Agent, or Firm—Townsend & Townsend

[57] ABSTRACT

In a horizontal mold clamping and vertical injection type die cast or injection molding machine of the type wherein stationary and movable metal molds are secured to stationary and movable platens and molten metal or plastic resin is injected into a mold cavity defined by metal molds from an injection cylinder, the stationary platen has a vertical member and a horizontal member integral therewith which extends beneath the stationary metal mold, and the injection cylinder is suspended from the horizontal member. This construction prevents leakage of molten metal and provides a large space for mounting the metal molds.

5 Claims, 10 Drawing Figures

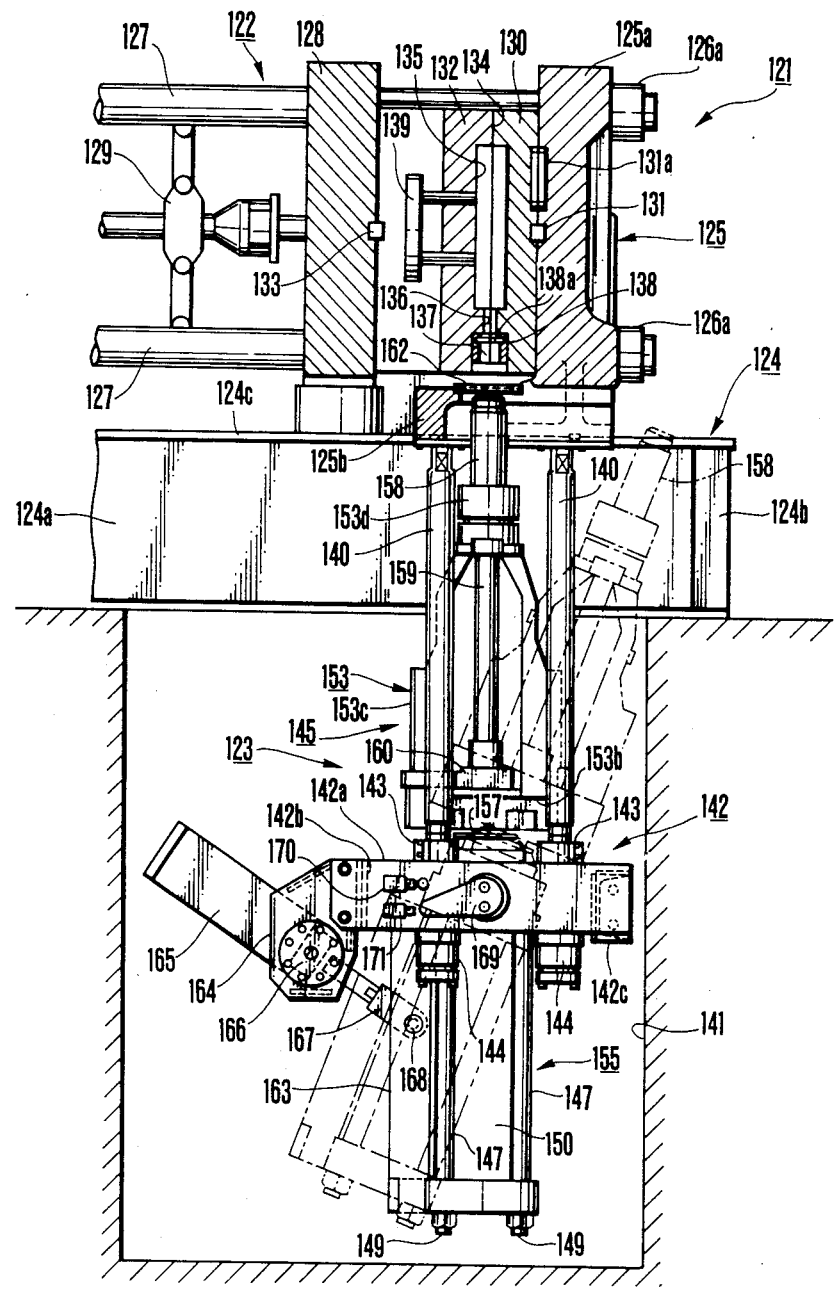
F I G. 6

HORIZONTAL MOLD CLAMPING AND VERTICAL INJECTION TYPE DIE CAST MACHINE

BACKGROUND OF THE INVENTION

This invention relates to a horizontal mold clamping and vertical injection type die cast machine, and more particularly to an injection device supporting structure for supporting the injection device by a stationary platen.

Injection molding machines such as a die cast machine and a plastic injection molding machine are generally termed an injection die cast machine in the following since these machines are similar, and the term "material to be injected" means molten metal in the case of a die cast machine whereas plastic resin in the case of an injection molding machine.

In the prior art die cast machine and plastic injection molding machine, the mold clamping direction and the injection direction are generally the same, but in recent years, a horizontal mold clamping and vertical injection type die cast machine has been developed. Examples of such types of die casting machines are disclosed in Japanese Patent Publication Nos. 55859/1983 (now Japanese Patent No. 1222503) and 13941/1984 (now Japanese Patent No. 1237694).

As will be described later, with these prior art machines, after pouring molten metal into a casting sleeve, the sleeve is raised to abut against a stationary sleeve and the molten metal is injected into a mold cavity by an oil pressure operated plunger.

These prior art horizontal mold clamping and vertical injection type die casting or injection molding machines are advantageous in that the length of the molten metal in the injection sleeve is short so that the temperature lowering is small, that the contact area between the molten metal and air is small so that the number of voids formed in the product caused by gas contained in the injection cylinder is small, and that at the time of completing the filling, the injection pressure is efficiently transmitted since the injection plunger is correctly opposed to the mold cavity. But there are problems in the supporting structure of the injection device.

More particularly, in the prior art injection molding machine, since the injection device is supported by tie bars depending from columns supporting a stationary molding die plate, the columns tend to bend due to the weight of the injection device, so that a gap is formed between the injection sleeve and the sleeve of the metal mold. Consequently, a substantial number of the products would become rejects or molten metal would leak through the gap. Moreover, as the tie bars require a large space, the width of the die cast machine increases.

SUMMARY OF THE INVENTION

Accordingly, it is an object of this invention to provide an improved horizontal mold clamping and vertical injection type die cast machine or an injection molding machine capable of preventing leakage of molten metal at the time of injection casting, thus preventing unsatisfactory cast or molded products as well as formation of burrs.

Another object of this invention is to provide a novel horizontal mold clamping and vertical injection type die cast machine or an injection molding machine capable of utilizing a large space for mounting metal molds.

Still another object of this invention is to provide a novel horizontal clamping and vertical injection type casting or molding machine having an improved supporting structure of the injection device.

According to this invention, there is provided a horizontal mold clamping and vertical injection type die cast machine comprising a stationary metal mold secured to a stationary platen, a movable metal mold secured to a movable platen, means for moving in the horizontal direction the movable platen together with the movable metal molds toward and away from the stationary metal mold and the stationary platen, the movable and stationary metal molds defining a mold cavity when they are clamped together, an injection cylinder for injecting material contained therein into the mold cavity and means for suspending the injection cylinder from the stationary platen, wherein the stationary platen comprises a vertical member and a horizontal member integral therewith which extends beneath the stationary metal mold, and the injection cylinder suspending means is suspended by the horizontal member.

BRIEF DESCRIPTION OF THE DRAWINGS

In the accompanying drawings:

FIG. 6 is a longitudinal sectional view showing another embodiment of a horizontal mold clamping and vertical casting type die cast machine according to this invention;

DESCRIPTION OF THE PREFERRED EMBODIMENTS

Figure 5:
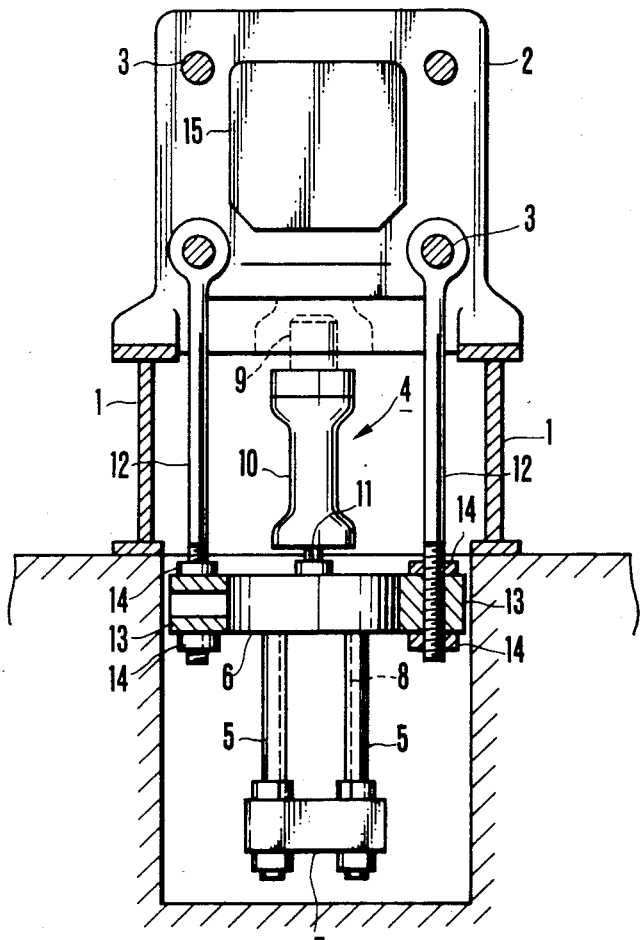
FIG. 5 is a side veiw, partly in section, showing a die cast machine utilizing a prior art injection device supporting structure.

Before describing the invention, the prior art injection molding machine acting as a die cast machine referred to above will firstly be described with reference to FIG. 5. The die cast machine shown therein comprises a vertical base 1 secured to the floor, a pair of stationary platens 2 (only one is shown) which are spaced in the direction perpendicular to the sheet of drawing. The four corners of the stationary platens 2 are interconnected by four columns 3. An injection device 4 is provided with upper and lower stationary platens 6 and 7 interconnected by four vertical columns 5, and an injection cylinder 8 is clamped between the upper and lower stationary platens 6 and 7. A block 10 supporting an injection sleeve 9 is mounted on the upper stationary platen 6 through a ram 11 to be movable in the vertical direction. The injection sleeve 9 is connected to a plunger, not shown, which is moved in the vertical direction by pressurized oil in the injection cylinder 8. The injection device 4 is supported by a pair of tie bars 12 depending from the pair of lower columns 3, and a pair of supporting beams 13 are secured to the lower ends of the depending tie bars 12 by nuts 14, whereby the lower board 6 is rotatably supported by the supporting beams 13. A stationary metal mold 15 and a movable metal mold, not shown, in front of the mold 15 are respectively mounted on the stationary platen 2 and a movable platen in front thereof. When the movable platen is moved in the horizontal direction together with the movable metal mold to close the molds, a mold cavity and a stationary sleeve are formed at the abutting surface of the movable and stationary molds.

After pouring molten metal into the injection sleeve 9, when the block 10 is raised by ram 11 to make the injection sleeve 9 abut against the stationary sleeve and when the plunger is raised by the pressurized oil in the injection cylinder 8, the molten metal in the injection sleeve 9 will be injected into the mold cavity. As described above, the prior art injection molding apparatus has various merits but problems to be solved still remain. The invention contemplates solution of these problems.

Figure 1:
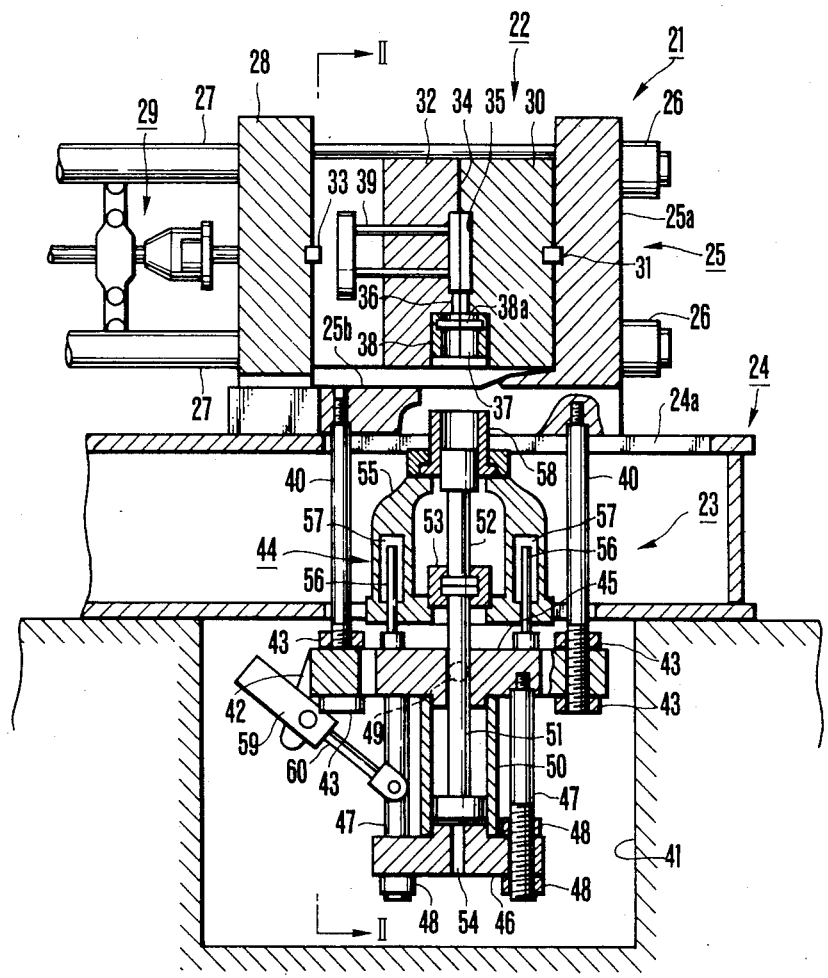
FIG. 1 is a longitudinal sectional view showing the injection device supporting structure of an injection molding machine embodying the invention.
Figure 2:
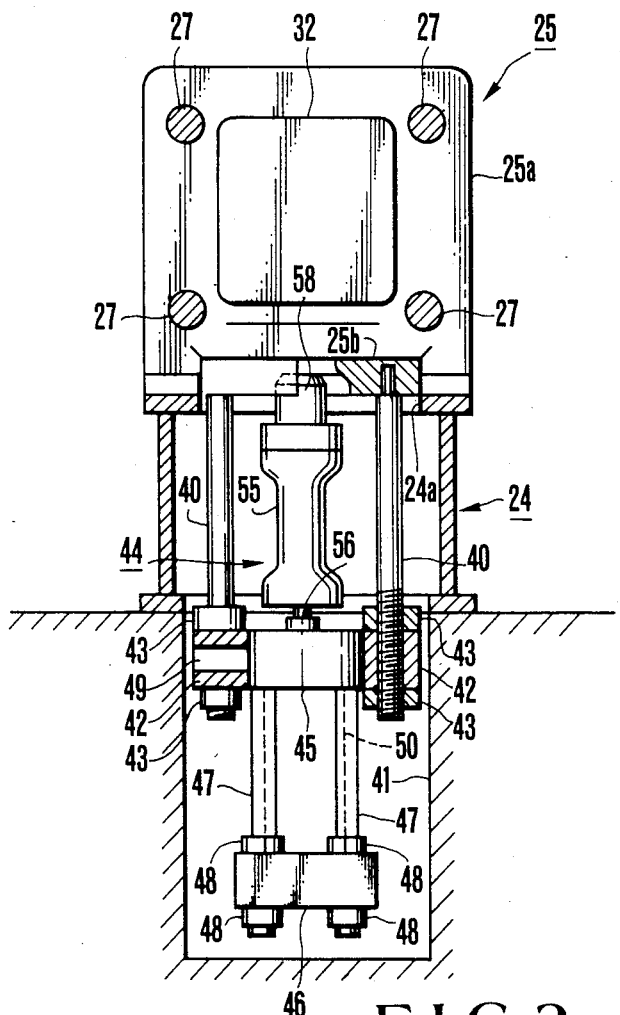
FIG. 2 is a sectional view taken along a line II—II in FIG. 1.

The die cast machine 21 of this invention shown in FIGS. 1 and 2 is constituted by a horizontal mold clamping unit 22, and a vertical casting unit 23. The horizontal mold clamping unit 22 is secured on a base 24 of the machine secured to the floor and extending in the horizontal direction as viewed in FIG. 1. A stationary platen 25 is secured to an edge of an opening formed at the rear end of the upper surface of the base 24. The stationary platen 25 has an L shape including a substantially square vertical member 25a and a horizontal member 25b extending toward a movable platen 28 to be described later. The width of the horizontal member 25b secured to the base 24 is slightly smaller than that of the vertical member. The other stationary platen, not shown, is adjustably secured to the other end of the base 24 to oppose the stationary platen 25. These two stationary platens are connected together by columns 27 secured to four corners of the stationary platens. A movable platen 28 is slidably fitted on column 27 to oppose the stationary platen 25 and connected to the mold clamping cylinder of the other stationary platen, not shown, through a toggle mechanism 29. A stationary metal mold is mounted on the stationary platen 25 and prevented from moving in the vertical direction by a key 31, while a movable metal mold 32 is mounted on the movable platen 28 and prevented from moving in the vertical direction by a key 33. Thus, the metal molds 30 and 32 are moved relatively in the horizontal direction to abut on each other at a split or mating plane 34. When clamped together, the metal molds 30 and 32 define a mold cavity 3, a throat 36 beneath it, and a vertical opening 37 contiguous to the throat 36. A split sleeve 38 is secured to the inner surface of the vertical opening 37. A push out device 39 is provided for the movable metal mold 32 to remove the cast product. At an upper portion of the sleeve 38, a circular recess 38a is formed in the inner wall of sleeve 38. The recess 38a is effective to capture a solidified surface layer of molten metal poured in a casting sleeve 58 to be described later which would otherwise be filled into the casting cavity.

The vertical casting unit 23 is provided with four depending supporting members in the form of tie rods 40 threaded into the horizontal member 25b of the stationary platen 25. The spacing between the tie rods 40 is smaller than that of the columns 27. The tie rods extend through the base 24 into a bin 41 below the floor surface. The lower ends of the tie rods 40 are secured by nuts 43 to four corners of a supporting beam 42 having a U shaped configuration when viewed from above. An injection device generally shown by a reference numeral 44 is rotatably supported by a supporting beam 42. The injection device 44 comprises a rectangular upper stationary board 45 and a lower stationary board 46 which are interconnected by 4 tie rods 47 with their upper ends threaded into the upper stationary board 45 and the lower ends secured to the lower stationary board 46 by nuts 48. The upper stationary board 45 is provided with a vertical pin 49 at the center, and the pin 49 is clamped between the two legs of the U shaped supporting beam 42 so as to rotatably support the injection device 44 with the supporting beam 42. An injection cylinder 50 is clamped between upper and stationary boards 45 and 46 at their central portions. The piston rod 51 of the injection cylinder 50 extends upwardly through the upper stationary board 45, and a plunger 52 is connected to the upper end of the piston rod 51 through a coupling 53. The lower stationary board 46 is provided with an oil supply port 54. A dome shaped block 55 is supported by a pair of pins 56 secured to the upper stationary board 45, and the bottom of the block 55 is shaped to receive the coupling 53. The block 55 is moved in the vertical direction by admitting pressurized oil into cylinders 57 of the block and by the vertical movement of the piston rod 51. To the upper end of the block 55 is secured a cylindrical casting sleeve 58 coaxial with and having the same diameter as the stationary sleeve 38. With the piston rod 51 elevated, when the block 55 is raised by the pressurized oil admitted into the cylinders 57, the casting sleeve 58 is urged against the stationary sleeve 38, whereas when block 55 is lowered, both sleeves are separated away. A tilting cylinder 59 is secured to the upper stationary board 45 and the free end of its piston rod 60 is pivotally connected to one tie rod 47 so that when the piston rod 60 is retracted, the injection device 44 is tilted about a pin 49 to enable pouring of the molten metal into the casting sleeve 58.

The die cast machine described above operates as follows:

After inserting plunger 52 in the casting cylinder 58, the tilting cylinder 59 is operated to tilt the injection device 44 about pin 49. After pouring molten metal into the casting sleeve 58 with a dipper or the like, the tilting cylinder 59 is operated in the opposite direction to bring the injection device 44 to the vertical position. Then pressurized oil is simultaneously introduced into the cylinders 57 and the injection cylinder 50 so as to raise the casting sleeve 58 and the plunger 52 for urging the casting sleeve 58 against the lower end of the stationary sleeve 38. Then the movable metal mold 32 is moved by the mold clamping cylinder through the toggle mechanism 29 and the movable platen 28 to clamp both metal molds 30 and 32. After urging the casting sleeve 58 against the stationary sleeve 38, pressurized oil is introduced into the injection cylinder 50 to raise plunger 52 for injecting the molten metal into the mold cavity 34 through sleeves 58 and 38 and throat 36. After injection and cooling of the cast product, the casting sleeve 58 is separated away from the metal molds 30 and 32. After opening the molds by operating the mold clamping cylinder, the cast product is removed from the metal molds 30 and 32 by the push out device 39, thus completing one cycle.

Figure 3:
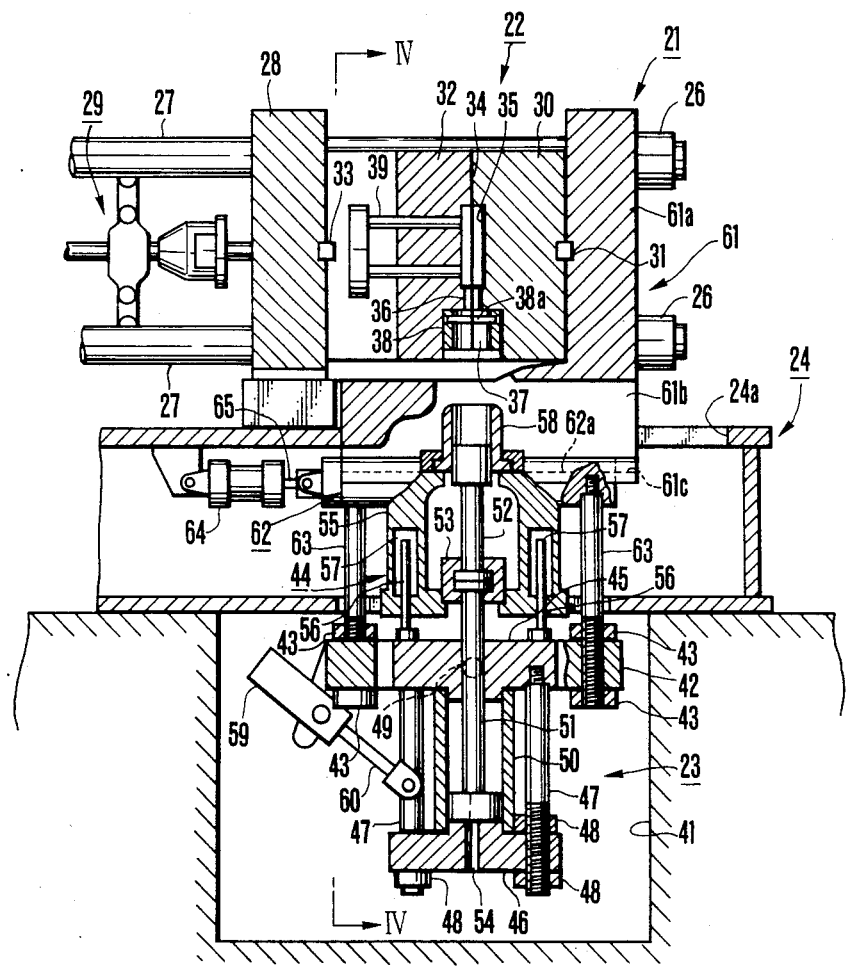
FIG. 3 is a longitudinal sectional view of a die cast machine showing a modification of this invention.
Figure 4:
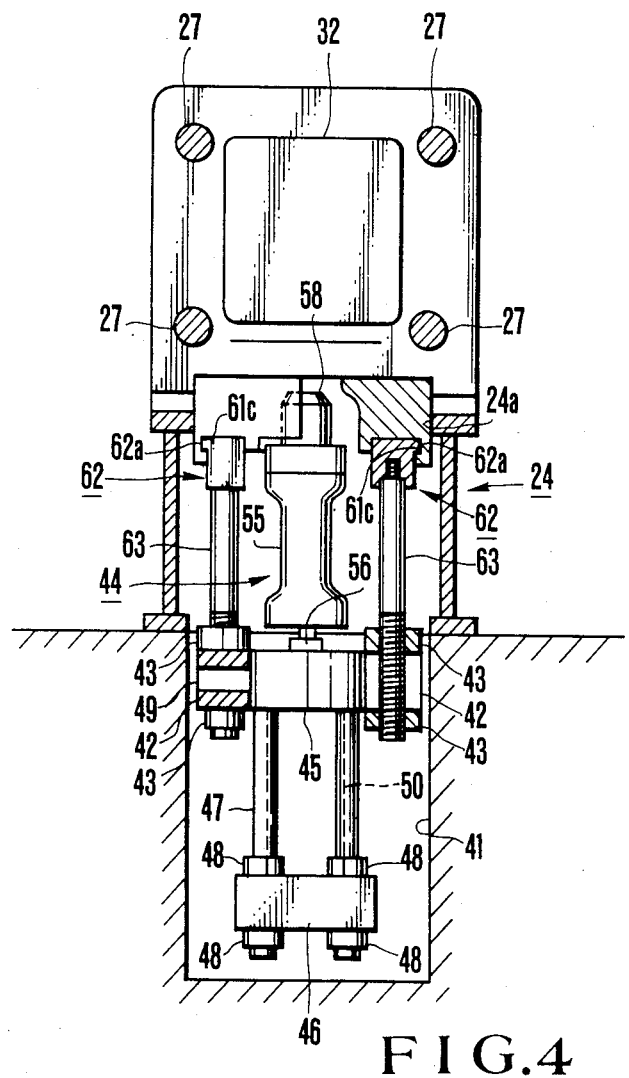
FIG. 4 is a longitudinal view taken along a line IV—IV in FIG. 3.

In a modified die cast machine shown in FIGS. 3 and 4, the vertical casting unit is constructed to move in the horizontal direction. In FIGS. 3 and 4 elements identical to those shown in FIGS. 1 and 2 are designated by the same reference numerals. The stationary platen 61 corresponding to the platen 25 shown in the previous embodiment has an L shaped configuration including a vertical member 61a and a horizontal member 61b integral therewith. However, the thickness of the horizontal member 61b is larger than the thickness of the horizontal member 25b of the previous embodiment. A groove 61c is formed in the bottom of horizontal member 61b and a rib 62a of a rectangular supporting plate 62 is received in the groove 61c so that the supporting plate 62 can move in the horizontal direction with respect to the horizontal member 61b. Vertical tie rods 63 shorter than the tie rods 40 of the previous embodiment are threaded into the bottom surface of the supporting plate 62 for supporting a supporting beam 42 at their lower ends. Like the previous embodiment, the supporting beam 42 and the injection device 44 are inclined by a tilting cylinder 59. A pneumatic cylinder 64 is secured to the rear surface of the upper plate of the base 24 through a bracket, and the free end of the piston rod 65 of the cylinder 64 is pivotally connected to one end of the supporting plate 62. With this construction, when the piston rod 65 reciprocates, the vertical casting unit 23 is moved in the horizontal direction in parallel with the mold clamping direction so that the casting sleeve 58 can be correctly aligned with the stationary sleeve 38 of the metal molds 30 and 32 irrespective of the variation in the dimensions of the metal molds 30 and 32. The casting operation is the same as that of the previous embodiment.

Although in the foregoing embodiments the invention was applied to a die cast machine, it will be clear that the invention is also applicable to a horizontal mold clamping and vertical injection type plastic injection molding machine.

According to the embodiments described above, the stationary platen to which the stationary metal mold is secured is constituted by an integral L shaped member having a vertical member and a horizontal member, and the injection device is supported by the supporting member depending from the horizontal member so as to support the whole injection device by a rigid movable board so that the injection device does not move downwardly due to its own weight. Consequently, there is no fear of leaking of molten metal through a gap between the casting sleeve and the metal molds and of forming burrs at the abutting surface of the metal molds. Since the upper end mounting member of the injection device supporting member does not occupy a large space, a space available for mounting the metal molds can be increased. Moreover, since the spacing between the supporting members of the injection device can be made smaller than the prior art construction, the overall size of the casting or injection device can be reduced.

In the illustrated embodiments wherein each of the L-shaped stationary platens 25 and 61 comprises a vertical member and a horizontal member integral therewith, it is advantageous to slightly incline the horizontal member upwards.

With this modification, for example when the horizontal member has an arm length of about 150 mm at a position intersecting the molten metal injection line, the inclination angle of the horizontal member is about 0.12 mm (in terms of subtending distance) before injection, with the casting sleeve 58 separated from the stationary sleeve 38 and with the casting unit 23 also about 0.12 mm inclined relative to the vertical mating line of the molds 30 and 32. But, immediately before completion of filling of molten metal, the horizontal member is deflected downwards owing to a repulsive force caused by molten metal injection and the inclination angle is zeroed, with the result that the molten metal injection line can exactly be aligned with the vertical mating line to prevent formation of an undesirable gap between the casting sleeve 58 and stationary sleeve 38 responsible for leakage of molten metal.

Figure 7:
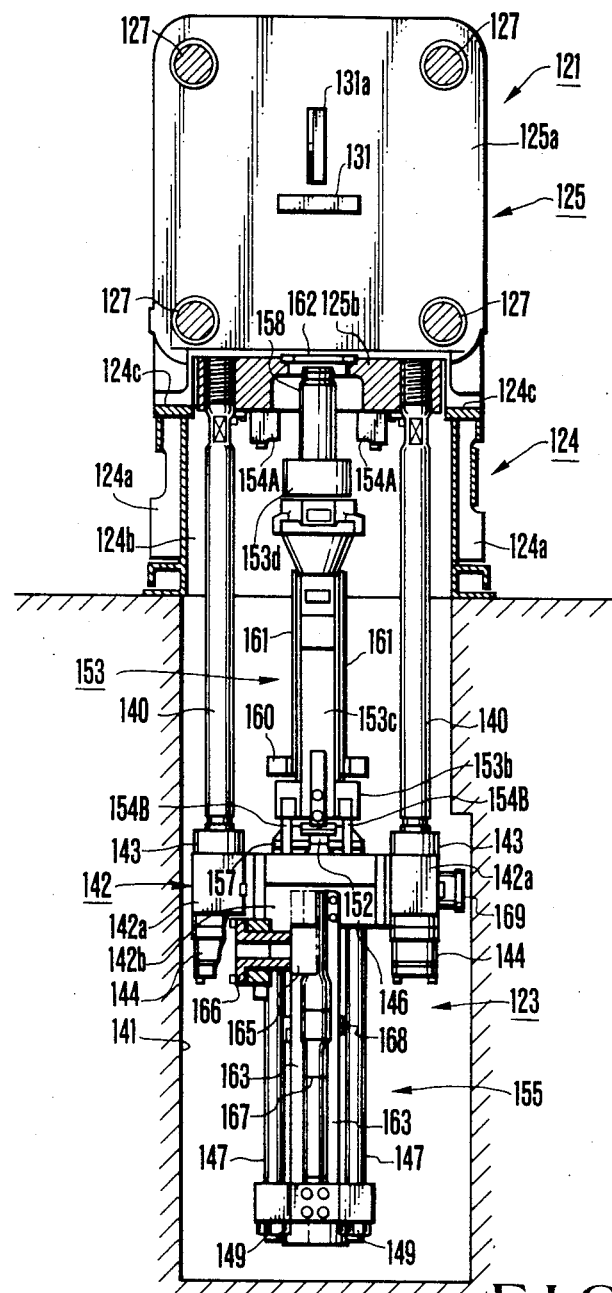
FIG. 7 is a lefthand side view of the die cast machine shown in FIG. 5.
Figure 8:
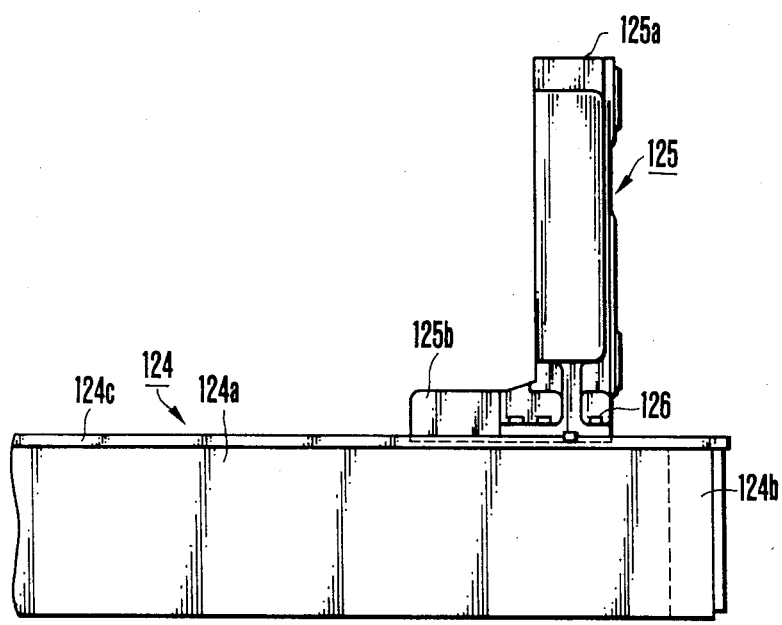
FIG. 8 is side view of the stationary platen and the base of the machine.
Figure 9:
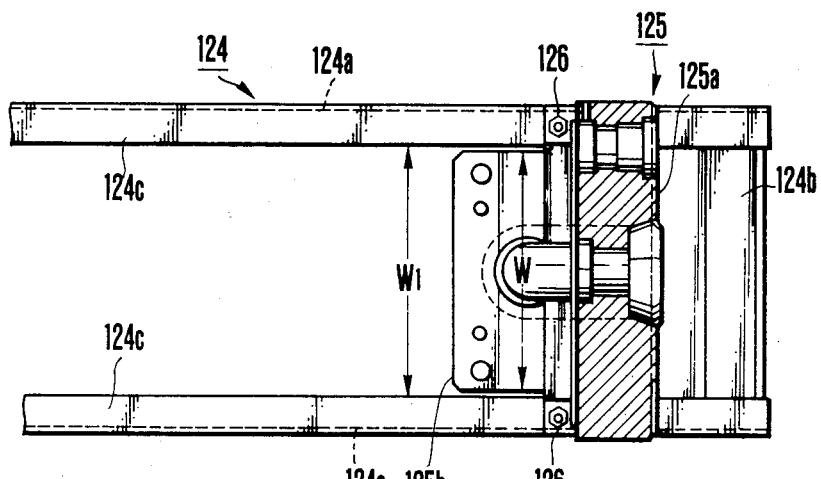
FIG. 9 is a plan view of the stationary platen and the base shown in FIG. 8.

The modified die cast machine 121 shown in FIGS. 6 to 10 comprises a horizontal mold clamping unit 122 and a vertical casting unit 123, the horizontal mold clamping unit 122 being secured to a base 124 fixed to the floor. The base 124 is constituted by a pair of spaced supporting members 124a extending in the horizontal direction, and a pair of connecting members 124b (only one is shown) interconnecting the opposite ends of the supporting members 124a. A pair of long rectangular slide plates 124c are mounted on the upper ends of the supporting members 124a. The stationary platen 125 is constituted by a substantially rectangular vertical member 125a having sufficient stiffness, and a horizontal member 125b disposed between the horizontal slide plates 124c. As shown in FIG. 8, the lower end of the vertical member 125a is secured to the slide plates 124c, thus securing the vertical member 125a to the base 124. As seen from FIG. 9, the horizontal member 125b of the stationary platen 125 has a width W which is slightly smaller than the spacing $W_1$ of a slide plates 124c. The horizontal member 125b is not secured to the base 124 so that when applied with a vertical external force, it deflects downwardly, although slightly. A cylindrical platen, not shown, is adjustably secured to the other end of the base 124, and the four corners of the stationary platen 125 and the cylindrical platen are interconnected by columns 127 secured by nuts 126a. A movable platen 128 is fitted on the columns 127 to oppose the stationary platen 125 and slidably mounted on the slide plates 124c to be movable toward and away from the stationary platen 125. The movable platen 128 is connected to the cylindrical platen through a toggle mechanism 129. A stationary metal mold 130 is prevented from moving in the vertical direction by a horizontal key 131 provided for the stationary platen 125, and the position of the stationary metal mold 130 in a direction perpendicular to the sheet of drawing is determined by a vertical key 131a at the central portion of the stationary platen 125. A movable metal mold 132 is mounted on the movable platen 128 by a key 133 which prevents vertical movement of th metal mold 132. These metal molds 130 and 132 are opened and closed at a split or mating surface 134.

The purpose of the vertical key provided between the stationary platen 125 and the stationary metal mold 130 on the center line of the machine is to readily align a casting sleeve 158 to be described later of the vertical casting unit 123, located beneath the abutting surface of the stationary metal mold 130 and the movable metal mold 132 and on the center line of the machine, with the stationary metal mold 130. The metal molds 130 and 132 define a mold cavity 135, a throat 136 beneath it and a vertical opening 137, which are formed on both sides of the mating surface 134. A split stationary sleeve 138 is fitted in the vertical opening 137, and a push out device 139 is provided for the movable metal mold for removing a cast product from the mold cavity 135. The sleeve 138 is formed with a circular recess 138a similar to the recess 38a of FIGS. 1 and 3.

The vertical casting unit 123 includes four vertical tie rods 140 with their upper ends threaded into threaded opening of the horizontal member 125b of the stationary platen 125. These tie rods 140 extend downwardly between both supporting members 124a of the base 124 to reach a bit 141 below the floor surface. There is provided a rectangular frame 142 constituted by a pair of supporting members 142a, connecting members 142b and 142c respectively interconnecting the opposite ends of the supporting members 142a. The lower ends of two tie rods 140 are threaded into each supporting member 142a and by clamping each tie rod 140 with upper and lower nuts 143 and 144, the frame 142 can be rigidly supported in the horizontal state.

Figure 10:
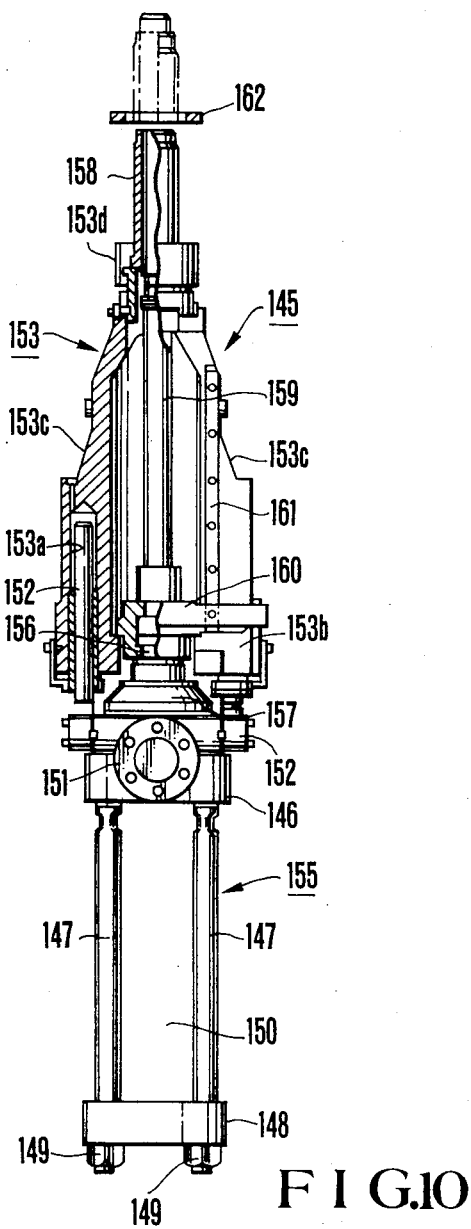
FIG. 10 is a front view, partly in section, showing the injection cylinder.

The injection device 145, details thereof being shown in FIG. 10, is swingably supported by the frame 142. More particularly, the injection device 145 is provided with a rod side block 146 having a plunger opening. A head cover 148 is secured by nuts 149 to the lower ends of vertical tie rods 147 with their upper ends threaded into threaded openings at the four corners of the lower surface of the block 146. A cylinder 150 is interposed between the block 146 and the head cover 148 and tightly fastened by tightening nuts 149. The block 146, tie rods 147, head cover 148, nuts 149 and cylinder 159 constitute an injection cylinder 155. Flanged tilting wheels 151 are provided on both sides of the block 146, the shafts of the tilting wheels 151 being journalled by the frame 142 so as to tiltably support the injection device 145 with the frame 142. A pair of vertical docking rams 152 are secured to both sides of the block 146 by keys and bolts. Major portion of each docking ram 152 takes the form of a round rod slidably received in an opening 153a of a sleeve frame 153. The sleeve frame 153 is constitutecd by a U shaped coupling receiver 153b at its lower end, cylindrical portions 153c extending upwardly from the coupling receiver, and a sleeve shaped member 153d connecting together the upper ends of the cylindrical portions 153c. When pressurized oil is introduced into openings 153a, the injection device 145 is raised upwardly from the position shown in FIG. 10. As shown in FIG. 7, stop members 154A are secured to the lower surface of the stationary platen 125 to limit the upward movement of the sleeve frame 153 and stop members 154B are secured to the frame 142 to limit the downward movement of the sleeve frame 153.

The injection device 155 including the cylinder 150 as the essential element is provided with a piston rod 156 movable in the vertical direction by the pressurized oil admitted into cylinder 150. The piston rod 156 extends through the frame 146 and its upper end is supported by a ground metal 157 secured to the frame 146. A cylindrical casting sleeve 158 is secured to the sleeve supporting member 153d at the upper end of the sleeve frame 153. A plunger 159 is supported by the casting sleeve to be movable in the vertical direction, and the lower end of the plunger 159 is coaxially connected to the piston rod 156 through a coupling 160. The lower periphery thereof is disposed to engage or disengage the upper inner surface of the coupling receiver 153b of the sleeve frame 153. The coupling 160 moves in the vertical direction while sliding along liners 161 bonded to both sides of a half of the sleeve frame 153. When the sleeve frame 153 is raised, the casting sleeve 158 abuts against the stationary sleeve 138 through the vertical opening 137 shown in FIG. 6; after abutting, the head portion of the plunger 159 rises through the openings of the casting sleeve 158 and the stationary sleeve 138. A centering ring 162 is secured to the horizontal member 125b of the stationary platen 125 for guiding the casting sleeve 158.

Apparatus for tilting the injection device 145 for the purpose of pouring molten metal (or plastic resin) will now be described. The one side of the rod side block 146 and the head cover 148 are interconnected by a pair of connecting plates 163, and a pair of brackets 164 are secured to the connecting member 142b of frame 142 to obliquely project downwardly. A tilting cylinder 165 is rotatably supported by the brackets 164 through bearings 166, and the outer end of its piston rod 167 is pivotally connected to the connecting plate 163 through a pin 168, whereby as the piston rod 167 is reciprocated by pressurized oil, the injection device 145 is moved between a solid line position and a dotted line position as shown in FIG. 6. A striker 169 is secured to one end of the tilting shaft 151 which rotates together with the injection device 145, and a pair of limit switches 170 and 171 are secured to the frame 142 to be actuated by the striker 169. These limit switches are used to hold the injection device 145 at the upright position or inclined position.

In operation, under a state wherein the sleeve frame 153 and the plunger 159 are at the lower position as shown in FIG. 6 and the injection device 145 is at the upright state, the injection device 145 would be tilted to the dotted line position about the tilting shaft 151 when pressurized oil is introduced into the tilting cylinder 165 to retract piston rod 167. This movement is stopped when the striker 169 actuates the limit switch 170. After pouring the molten metal into the casting sleeve 158, pressurized oil is introduced into the head end of the tilting cylinder 165 to rotate the injection device 145 to the upright position which is maintained by the limit switch 171 actuated by striker 169. Before this, the movable platen 128 has been advanced by the mold clamping cylinder through toggle mechanism 129 thus completing clamping of both metal molds 130 and 132. Consequently, as the pressurized oil is supplied simultaneously to the cylinders 153a and the injection cylinder 155, the sleeve frame 153 is raised with the plunger 159 maintained at the lower position, to hold the poured molten metal, and with the docking ram 152 left. Thus, the casting sleeve 158 is urged against the lower end of the stationary sleeve 138 through the vertical opening 137. When supply of the pressurized oil to the injection cylinder 155 continues, the plunger 159 is raised to inject the molten metal into the mold cavity 135 through sleeves 158 and 138 and throat 136.

At the time of injecting the molten metal, the pressure thereof acts upon the metal molds 130 and 132. When the stationary platen 125 is rigidly secured to the base 124, there is no measure for releasing the molten metal pressure with the result that the metal molds 130 and 132 would be opened. In contrast, according to this modification, since the vertical portion 125a of the stationary platen 125 has a sufficient rigidity and since the horizontal member 125b of the stationary platen 125 floats between the slide plates 124c of the base 124, the reaction of the molten metal pressure acts downwardly upon the horizontal member 125b and deflects the same only slightly. As a consequence, this downward reaction vibrates only slightly the injection device 145 and the tie rods 140 via a flexure of the horizontal member 125b, and the vertical member 125c would not be flexed, whereby the metal molds 130 and 132 would not open.

Immediately before completion of the injection, a large injection pressure is applied to the inside of the mold cavity 135 of the metal molds 130 and 132 so that injection reaction acts upon the horizontal member 125b of the stationary platen 125, whereby the horizontal member 125b slightly flexes downwards. Accordingly, the casting sleeve 158 tends to move away from the lower stationary sleeve 138 of metal molds 130 and 132. At this time, however, a thin solidified layer is created on the surface of the molten metal in contact with the inner surfaces of the stationary sleeve 138 and the casting sleeve 158 so that the molten metal would not blown out through the gap between the stationary sleeve 138 and the casting sleeve 158 and no trouble would be encountered in the injection operation.

Following the injection casting, when the molten metal solidifies and cools, the pressurized oil is drained from the cylinders 153a. At the same time the pressurized oil is supplied to the rod end of the injection cylinder 155 for lowering the sleeve frame 153 together with the plunger 159 to separate the casting sleeve 158 from the metal molds 130 and 132. Thereafter, the mold clamping cylinder is operated to open the molds and the cast product is removed from the metal molds 130 and 132 by means of the push out device 139, thus completing one cycle of the operation.

It should be understood that this modification is also applicable to a plastic injection molding machine.

As described above, according to the modification shown in FIGS. 6 to 10, the stationary platen adapted to support the stationary metal mold is constituted by an L shaped member comprising a vertical member secured to the machine base and a horizontal member extending from the lower end of the vertical member toward the lower side of the metal mold, and the injection device is supported by supporting members depending from the horizontal member. Moreover, the horizontal member is installed to float such that it does not come into contact with the inner sides of slide members on both sides of the base and hence is not secured to the machine base. Thus, the injection device can be supported by a strong stationary platen, and no gap would be formed between the abutting ends of the casting sleeve and the stationary sleeve due to the weight of the injection device, unlike the prior art construction wherein the injection device is supported by the rods. Moreover, even when the reaction caused by the injection pressure is applied to the stationary platen, the horizontal member slightly flexes, thus causing a slight vibration of the injection device so that there is no fear of opening the metal molds and forming a gap between the abutting ends of the casting sleeve and the stationary sleeve, thereby preventing flow out of the molten metal and formation of burrs. This improves the safety of the operation and quality of the cast or injected products.

Furthermore, as the upper mounting portion of the supporting member of the injection device does not occupy a large space, a large space is available for mounting the metal molds. In addition, the spacing between the supporting members of the injection device can be made smaller than a prior art case wherein the injection device is supported by columns. This not only decreases the width of the machine but also miniaturizes the machine.

What is claimed is:

1. In a horizontal mold clamping and vertical injection type die cast machine comprising a stationary metal mold (30) secured to a stationary platen (25), a movable metal mold (32) secured to a movable platen (28), means for moving in a horizontal direction said movable platen together with said movable metal mold toward and away from said stationary metal mold and said stationary platen, said movable and stationary metal mold defining a mold cavity (35) when said movable and stationary metal molds are clamped together, an injection device disposed under said stationary mold and said movable mold and having an injection cylinder for containing a molten metal to be injected into said mold cavity, and means (40) for suspending said injection device from said stationary platen (25), the improvement wherein said stationary platen 25 comprises a vertical member (25a) and a horizontal member (25b) which is integrated with said vertical member, said horizontal member extending from a lower end of said vertical member toward said movable platen beneath said stationary metal mold, and said injection device suspending means is suspended from said horizontal member.

2. The die casting machine according to claim 1 which further comprises means for normally holding said injection cylinder at a vertical position in alignment with said mold cavity and tilting said injection cylinder to a position remote from said mold cavity for pouring molten metal.

3. The die casting machine according to claim 2 which further comprises means for reciprocating in the horizontal direction said injection cylinder between said vertical position to a position remote from said mold cavity at which material to be injected is poured into said injection cylinder.

4. The die casting machine according to claim 1 wherein an inner end of said horizontal member is inclined upwardly by an angle which approximates zero degrees immediately before completion of injection.

5. The die casting machine according to claim 1 further comprising means for securing said stationary platen on an upper surface of a machine base, and supporting means depending from said horizontal member for supporting said injection cylinder, wherein said horizontal member has a width smaller than a spacing between a pair of slide members provided for said machine base whereby said horizontal member is not secured to said machine base.

* * * * *